United States Patent
Chludek

[11] Patent Number: 5,234,072
[45] Date of Patent: Aug. 10, 1993

[54] DRIVE ASSEMBLY FOR A FOUR WHEEL DRIVE VEHICLE

[75] Inventor: Adrian Chludek, St. Augustin, Fed. Rep. of Germany

[73] Assignee: Viscodrive GmbH, Lohmar, Fed. Rep. of Germany

[21] Appl. No.: 909,227

[22] Filed: Jul. 2, 1992

[30] Foreign Application Priority Data

Jul. 4, 1991 [DE] Fed. Rep. of Germany ....... 4122126

[51] Int. Cl.$^5$ .......................................... B60K 17/346
[52] U.S. Cl. .................................. 180/248; 180/249; 192/48.1
[58] Field of Search ............... 180/248, 249; 192/48.1

[56] References Cited

U.S. PATENT DOCUMENTS

| | | | |
|---|---|---|---|
| 4,650,202 | 3/1987 | Tsuzuki | 180/248 |
| 4,747,464 | 5/1988 | Lanzer | 180/248 |
| 4,949,594 | 8/1990 | Galhotra | 180/248 X |
| 5,042,610 | 8/1991 | Shiraishi et al. | 180/249 |
| 5,174,408 | 12/1992 | Höck | 180/249 X |

FOREIGN PATENT DOCUMENTS

| | | |
|---|---|---|
| 424054 | 4/1991 | European Pat. Off. |
| 4023797 | 2/1991 | Fed. Rep. of Germany |
| 3934913 | 4/1991 | Fed. Rep. of Germany |

Primary Examiner—Robert J. Oberleitner
Assistant Examiner—Carla Mattix
Attorney, Agent, or Firm—Harness, Dickey & Pierce

[57] ABSTRACT

The invention relates to a drive assembly for a four wheel drive vehicle with the distributor assembly for distributing driving torque arranged between the front wheels and the rear wheels of a driving axle. A distributor differential (13) and axle differential (15) distribute the driving torque. Both the distributor differential (13) and the axle differential (15) may be at least partially locked via viscous couplings (39, 40) in order to cancel the differential function. I order to achieve the shortest possible design, the two viscous couplings (39, 40) are arranged coaxially one inside the other.

8 Claims, 2 Drawing Sheets

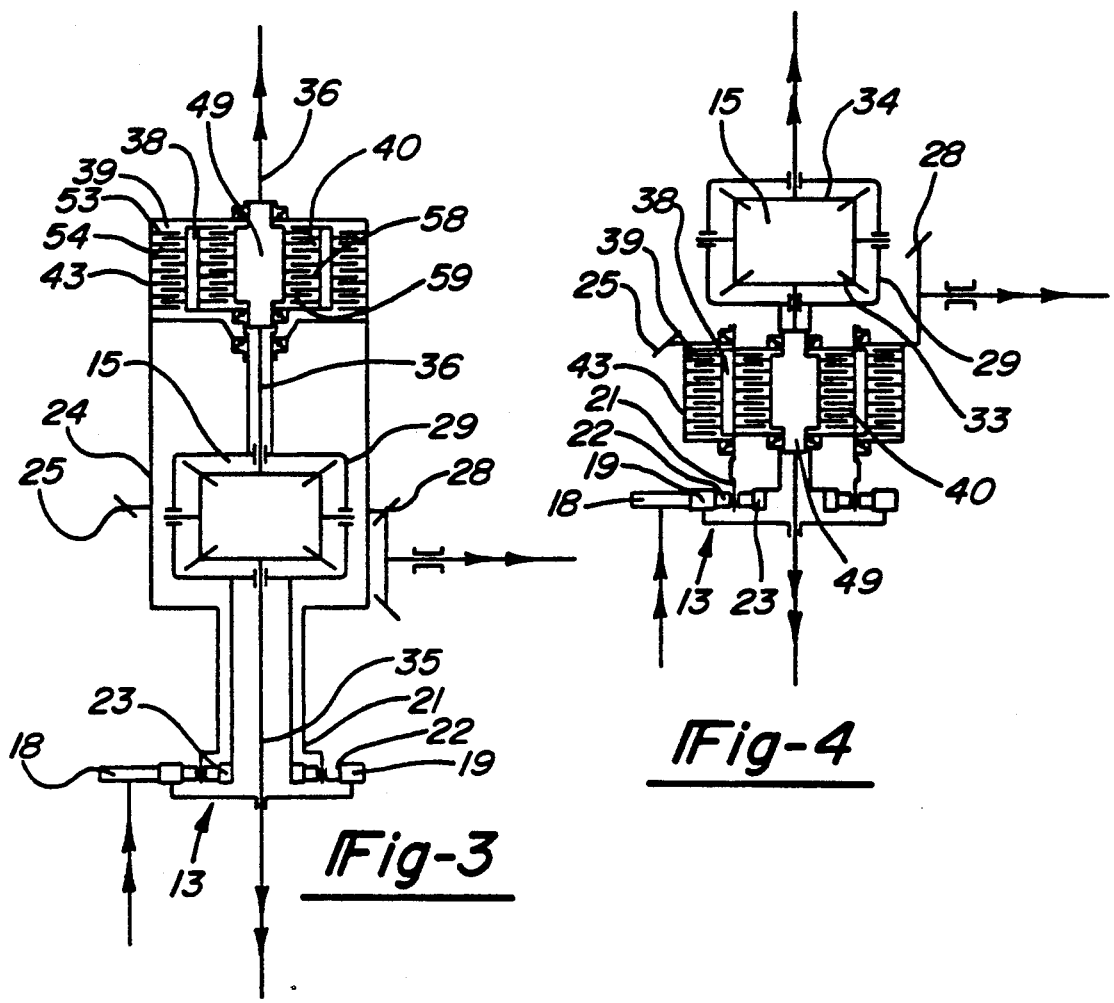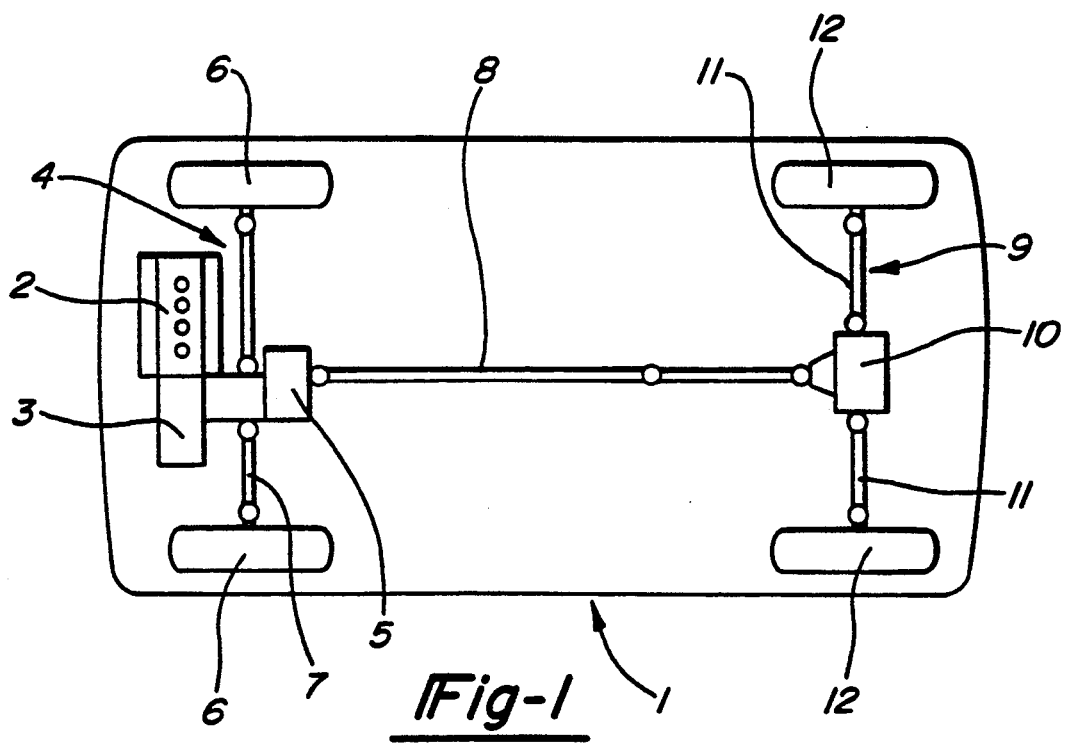

DRIVE ASSEMBLY FOR A FOUR WHEEL DRIVE VEHICLE

BACKGROUND OF THE INVENTION

The invention relates to a drive assembly for a four wheel drive vehicle and, more particularly, to a distributor differential distributing output torque between two driving axles. A first viscous coupling is associated with the distributor differential to at least partially cancel the differential function. The distributor differential and first viscous coupling are arranged in the region of a driving axle. The driving axle includes an axle differential whose differential function may also be cancelled at least partially via a second viscous coupling. The first member of the distributor differential is connected to the gearbox of the motor vehicle. The second member of the distributor differential is connected to the axle drive of the second driving axle. The third distributor differential member is connected to the axle drive of the first driving axle. The first viscous coupling is arranged between the second and third members. The second viscous coupling is arranged between the differential gear carrier of the axle differential of the axle drive of the first driving axle and its output end relative to one wheel of the first driving axle.

Such an assembly requires a considerable installation length. Normally, such drive assemblies are arranged in the front axle of a front wheel drive vehicle. Further, in these vehicles, only a small amount of space is available because space is also required by the engine, gearbox and associated assemblies.

SUMMARY OF THE INVENTION

It is the object of the invention to provide a drive assembly which enables installation into a short space. The assembly also permits at least partial locking of the differential functions of the axle differential and of the distributor differential.

In accordance with the invention, the objective is achieved by arranging two viscous couplings coaxially with one inside the other. The inner plates of the outer viscous coupling and the outer plates of the inner viscous coupling are non-rotatingly associated with a joint plate carrier. The carrier is non-rotatingly associated with a third member of the distributor differential. The transmission ratio of the distributor differential is such that, with identical friction conditions prevailing at the vehicle wheels of the two driving axles, the second and third member of the distributor differential rotate at the same speed.

The advantage of this design is a compact arrangement is achieved by positioning the viscous couplings one inside the other. Thus, the invention also achieves a considerable reduction in weight and in the axial installation length.

According to a further embodiment, the distributor differential is designed as a spur gear differential. A ring gear constitutes the first member, the planetary gear carrier the second member and the sun gear the third member.

A particularly advantageous way to arrange the two viscous couplings one inside the other as well as the associated components is achieved in a further embodiment of the invention. In the embodiment, one end of the coupling hub, which carries the inner plates of the second viscous coupling, is rotatably accommodated in a flange. The other end of the hub is rotatably accommodated in a first cover of the coupling housing. The flange is non-rotatingly connected to the sleeve of the plate carrier on the one hand and to the differential gear carrier of the axle differential on the other hand. The two ends of the coupling sleeve of the first viscous coupling are each non-rotatingly connected to a cover. The cover which supports the coupling hub constitutes the first cover and the second cover supports the plate carrier.

At its end facing away from the flange, the plate carrier is preferably guided in a recess of the first cover. Furthermore, this end may also be sealed relative to the cover in order to seal the interior of the first viscous coupling relative to that of the second viscous coupling. Thus, mutual influencing is avoided by the positioning of two viscous couplings.

According to a further embodiment, the distributor differential is arranged on the one side of the axle differential and the two viscous couplings on the other side. Therefore, to achieve driving connections, the coupling housing, via teeth, is non-rotatingly connected to a driving dish which, via further end of the planetary gear carrier.

Alternatively, it is proposed that the two viscous couplings should be arranged between the distributor differential and the axle differential.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention and its application to a four wheel drive motor vehicle are diagrammatically illustrated in the drawing wherein:

FIG. 1 is a schematic view of a motor vehicle having a drive assembly in accordance with the invention.

FIG. 3 is a schematic view of a simplified embodiment of the assembly according to FIG. 2.

FIG. 4 is a schematic view of an alternative embodiment of the assembly.

DETAILED DESCRIPTION OF THE PREFERRED EMBODIMENTS

Figure 2:
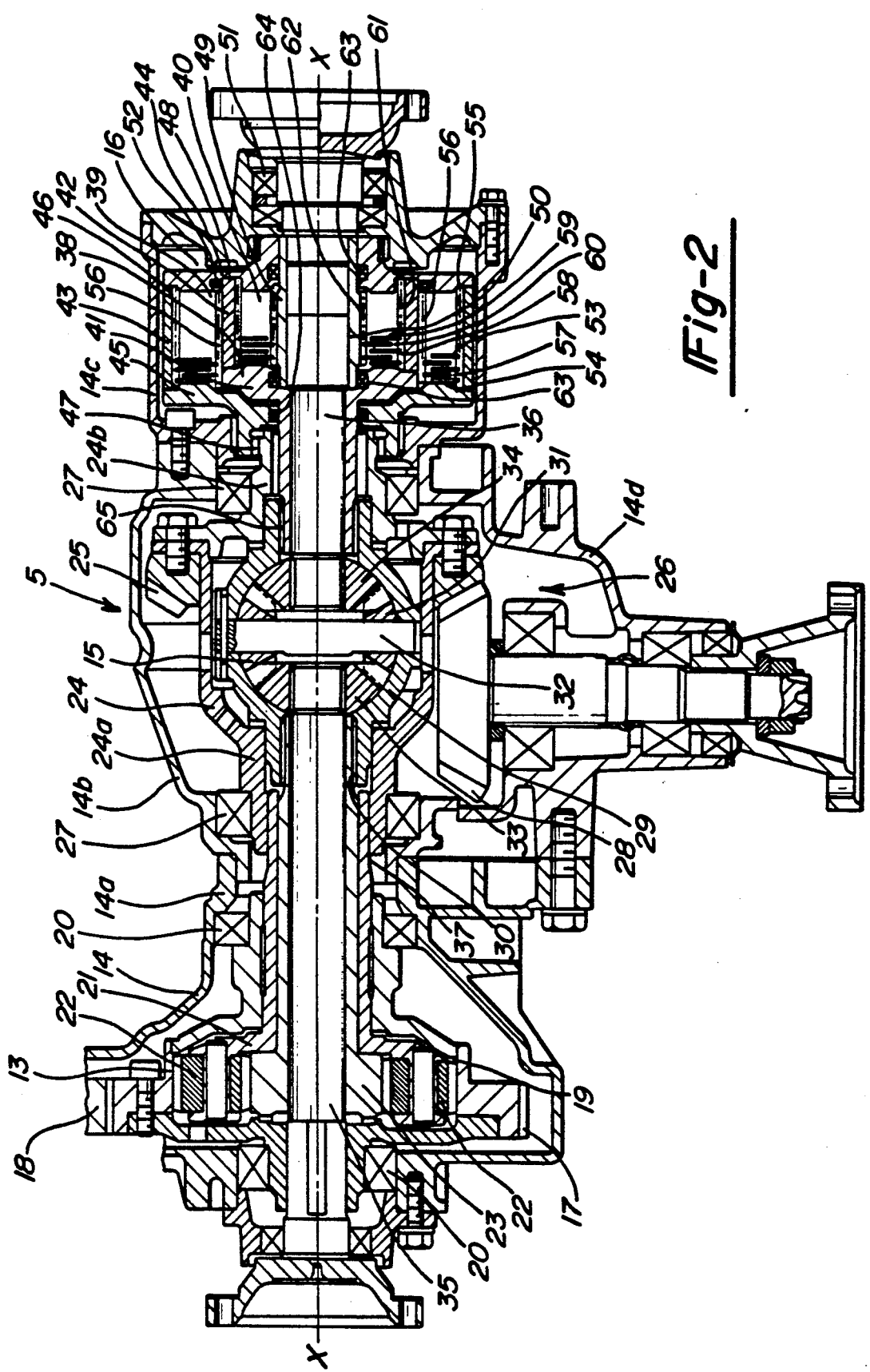
FIG. 2 is a cross section view of a preferred embodiment of the distributor assembly in accordance with the present invention.

In the case of the vehicle 1 illustrated in FIG. 1, the engine 2 and the gearbox 3 are arranged in the region of the front axle 4. The distributor assembly 5 serves to distribute the driving torque to the front wheels 6 and the rear wheels 12. The front wheels 6 are driven via the front axle differential not shown in detail and via the sideshafts 7. The driving torque reaches the rear wheels 12 via the distributor assembly 5, the propeller shaft 8, the rear axle differential 10 and the sideshafts 11. The rear axle is designated with the reference numeral 9.

The distributor assembly 5 will be explained in more detail with reference to FIGS. 2 to 4. The distributor assembly 5, arranged in the region of the front axle 4, constitutes the first driving axle includes a multi-component housing 14. Part 14a of the housing accommodates the distributor differential 13, housing part 14b the front axle differential 15, housing part 14c the viscous coupling assembly and housing part 14d the distributing drive 26.

The distributor differential 13 is driven by the driving pinion 18 of the engine drive. The distributor differential 13 includes a toothed outer ring 17 whose teeth engage the driving pinion 18. The outer ring 17 forms part of the ring gear 19 of the distributor differential 13. The outer ring 17 and ring gear 19 constitute the first member of the distributor differential 13. The ring gear 19 is divided and has projections held in bearings 20. The bearings 20 serve to support the ring gear 19 in the housing part 14a. The projection of the ring gear 19, pointing towards the front axle differential 15, accommodates the planetary gear carrier 21. The planetary gears 22 are rotatably arranged on circumferentially distributed journals. The teeth of the planetary gears 22 engage the teeth of the ring gear 19. The planetary gears 22 also engage the central sun gear 23 which constitutes the third member of the distributor differential 13.

A hollow cylindrical projection of the sun gear 23 extends coaxially through the projection of the planetary gear carrier 21 in the direction of the front axle differential 15. The differential gear carrier 29 of the front axle differential 15 is non-rotatingly connected to the hollow cylindrical projection of the sun gear 23, via teeth 30. A bearing pin 32 is arranged in the differential gear carrier 29 so as to extend at right angles relative to the rotational axis X—X. The differential gears 31 engage output bevel gears 33, 34. The output bevel gear 33 may be connected to the left sideshaft of the front axle 4, for example, via a plug-in shaft 35. The plug-in shaft 35 projects from the housing 14 in the direction of the rotational axis X—X and, at its end, carries a flange to attach with the sideshaft.

The differential gear carrier 29 is rotatably accommodated in a driving dish 24 which is divided and includes parts 24a and 24b non-rotatingly connected to each other. The driving dish 24 is rotatably held in two bearings 27 in the housing part 14b. The driving dish part 24a, via teeth 37, is non-rotatingly connected to corresponding teeth in the hollow cylindrical projection of the planetary gear carrier 21.

Furthermore, the driving dish 24 includes a crown wheel 25 which is engaged by the teeth of a bevel gear 28. The bevel gear 28 includes a journal which projects from the housing part 14d and serves to connect the propeller shaft 8 (illustrated in FIG. 1) to transmit the driving torque to the rear wheels 12 of the rear axle 9. The bevel gear 28 and the crown wheel 25 form the distributing drive 26.

The second part 24b of the driving dish 24 is non-rotatingly connected to the coupling housing 43 of the two viscous couplings 39, 40 via mutually engaging teeth 47. With reference to the rotational axis X—X, the two viscous couplings 39, 40 are arranged coaxially one inside the other. The first viscous coupling 39 is arranged around the second viscous coupling 40. The plate carrier 38 is rotatably accommodated inside the coupling housing 43. The plate carrier 38 has a flange 41 with a hollow cylindrical projection which, via teeth 65, is non-rotatingly connected to the differential gear carrier 29.

The coupling housing 43 has a first cover 44, a second cover 45 and the coupling sleeve 46 connected between the two covers. The sleeve 42 of the plate carrier 38 axially extends into a recess 48 of the first cover 44. It is sealed relative to the cover 44 by a seal 52. The coupling housing 43 is rotatably supported in the housing part 14c via hollow cylindrical projections at the ends of its covers 44, 45. The second cover 45 is rotatably received on the hollow cylindrical projection of the flange 41 and sealed relative thereto by a seal 64. The coupling hub 49 is rotatably accommodated in the first cover 44 on the one hand and in the flange 41 of the plate carrier 38 on the other hand and sealed via seals 63.

On its outer face and inner face, the sleeve 42 of the plate carrier 38 has receiving teeth 56, 61. The outer face teeth 56 serve to non-rotatingly, but axially movably accommodate inner plates 54 of the externally positioned viscous coupling 39. The inside of the coupling sleeve 46 of the coupling housing 43 is also provided with receiving teeth 55 which non-rotatingly receive the outer plates 53. The outer plates 53 and inner plates 54 are arranged so as to alternate in a certain sequence. The outer plates 53, for example, are held at a certain distance from one another in the axial direction via spacing rings 57. The part of the interior of the first viscous coupling 39 not filled with the inner plates 54 and the outer plates 53 is at least partially filled with a viscous medium, for example a high-viscosity silicone oil.

The inner receiving teeth 61, associated with the sleeve 42 of the plate carrier 38, serve to non-rotatingly receive outer plates 58 associated with the inner second viscous coupling 40. The outer plates 58, too, are arranged to alternate in a certain sequence with the inner plates 59 and are preferably spaced via spacing rings 60. The inner plates 59 are non-rotatingly held in the receiving teeth 62 of the coupling hub 49. The part of the interior of the second viscous coupling 40 unoccupied by inner plates 59 and outer plates 58 is also at least partially filled with a viscous medium.

The plug-in shaft 36 is plugged through the coupling hub 49 from the outside. Via plug-in teeth 50, the plug-in shaft 36 is non-rotatingly connected to the coupling hub 49. The plug-in shaft 36 passes through the coupling hub 49. Also, the shaft 36 passes through the projection of the flange 41 of the plate carrier 38 and is non-rotatingly connected to the second driving bevel gear 34. The plug-in shaft 36 is rotatably held in the bearing 51.

Under normal conditions, i.e. when all four vehicle wheels operate on the ground under identical friction conditions, e.g. on a dry road, there is no speed differential. If there occurs a speed differential between the two wheels of the front axle 4, the coupling hub 49 and the plate carrier 38 rotate relative to each other. As a result of the shear effect between the inner plates 59 and the outer plates 58 in the second viscous coupling 40, a moment builds up. If, on the other hand, there occurs a speed differential between the wheel of the rear axle 9 and those of the front axle 4, the first viscous coupling 39 reacts to the speed differential occurring between the plate carrier 38 and the coupling housing 43. The fact that the two viscous couplings 39, 40 are coaxially arranged one inside the other ensures that when all four vehicle wheels operate on the ground with the same friction coefficient, no relative rotation occurs in the two viscous couplings 39, 40. Accordingly, in this case, the coupling housing 43, the plate carrier 38 and the coupling hub 49 rotate at the same speed.

In the embodiment of FIGS. 2 and 3, the two viscous couplings 39, 40 are arranged on one side of the front axle differential 15 and the distributor differential 13 on the other side of the front axle differential 15. In the embodiment diagrammatically illustrated in FIG. 4, the two viscous couplings 39, 40 and the distributor differential 13 are arranged on one side of the front axle differential 15. Again, the viscous couplings 39, 40 are coaxially arranged one inside the other and are positioned between the distributor differential 13 and the front axle differential 15. This design further simplifies the assembly by eliminating the driving dish 24 of the embodiment of FIGS. 2 and 3. Furthermore, the crown wheel 25 may be associated directly with the coupling housing 43. The third member of the distributor differential 13 is again constituted by the sun gear 23. The sun gear 23 is directly connected to the plate carrier 38 which, in turn, is non-rotatingly connected to the differential gear carrier 29. Again, the coupling hub 49 is connected to the plug-in shaft for the lefthand front wheel on the one hand and to the output bevel gear 33 on the other hand. The coupling housing 43 is non-rotatingly connected to the planetary gear carrier 21.

While the above detailed description describes the preferred embodiment of the present invention, the invention is susceptible to modification, variation, and alteration without deviating from the scope and fair meaning of the subjoined claims.

I claim:

1. A drive assembly for a four wheel drive vehicle comprising:
   a distributor differential distributing output torque between two driving axles;
   a first viscous coupling associated with said distributor differential for at least partially cancelling differential functions;
   an axle differential associated with said distributor differential;
   a second viscous coupling associated with said axle differential for at least partially cancelling differential functions;
   a first member of said distributor differential being connected to a gearbox of an engine, a second member of said distributor differential being connected to an axle drive of a second driving axle and a third member of said distributor differential being connected to an axle drive of the first driving axle, said first viscous coupling being arranged between the second and third distributor differential members and the second viscous coupling being arranged between a differential gear carrier of the axle differential of the axle drive of the first driving axle and its output end relative to one wheel of the first driving axle;
   said two viscous couplings being coaxially arranged one inside the other, inner plates of the outer viscous coupling and outer plates of the inner viscous coupling being non-rotatingly associated with a joint plate carrier, said joint plate carrier being non-rotatingly associated with said third member of the distributor differential; and
   transmission ratio of the distributor differential is such that, with identical friction conditions prevailing at vehicle wheels of the two driving axles, the second and third distributor differential members rotate at the same speed.

2. The drive assembly according to claim 1, wherein said distributor differential is designed as a spur gear differential, including a ring gear constituting said first member, a planetary gear carrier as said second member and a sun gear as said third member.

3. The drive assembly according to claim 2, wherein one end of a coupling hub carrying inner plates of said second viscous coupling being rotatably accommodated in a flange and the other end rotatably accommodated in a first cover of a coupling housing, the flange being non-rotatingly connected to a sleeve of the plate carrier on the one hand and to the differential gear carrier of the axle differential on the other hand, two ends of a coupling sleeve of said first viscous coupling being each non-rotatingly connected to said first cover and a second cover, the cover supporting the coupling hub constituting the first cover and the second cover supporting the plate carrier.

4. The drive assembly according to claim 3, wherein said plate carrier at its end facing away from the flange, is guided in a recess of the first cover.

5. The drive assembly according to claim 1 wherein said two viscous couplings are sealed relative to each other.

6. The drive assembly according to claim 3, wherein said coupling housing includes teeth non-rotatingly connecting to a driving dish, said dish including teeth non-rotatingly connecting to the end of the planetary gear carrier.

7. The drive assembly according to claim 1 wherein said two viscous couplings are arranged between the distributor differential and the axle differential.

8. The drive assembly according to claim 1, wherein said two viscous couplings are arranged on one side of the axle differential and said distributor differential arranged on the other side.

* * * * *